United States Patent
Frank

(10) Patent No.: US 9,151,313 B2
(45) Date of Patent: Oct. 6, 2015

(54) FASTENING ELEMENT

(75) Inventor: Uwe Frank, Pfedelbach-Windischenbach (DE)

(73) Assignee: Würth International AG, Chur (CH)

( * ) Notice: Subject to any disclaimer, the term of this patent is extended or adjusted under 35 U.S.C. 154(b) by 734 days.

(21) Appl. No.: 12/920,215

(22) PCT Filed: Mar. 5, 2009

(86) PCT No.: PCT/EP2009/001548
§ 371 (c)(1),
(2), (4) Date: Oct. 13, 2010

(87) PCT Pub. No.: WO2009/109383
PCT Pub. Date: Sep. 11, 2009

(65) Prior Publication Data
US 2011/0033264 A1 Feb. 10, 2011

(30) Foreign Application Priority Data
Mar. 7, 2008 (DE) .......................... 10 2008 014 840

(51) Int. Cl.
*F16B 13/04* (2006.01)
*F16B 25/10* (2006.01)
*F16B 19/10* (2006.01)
*F16B 25/00* (2006.01)
*F16B 35/04* (2006.01)

(52) U.S. Cl.
CPC ............ *F16B 25/106* (2013.01); *F16B 19/1045* (2013.01); *F16B 25/0021* (2013.01); *F16B 35/044* (2013.01); *Y10T 29/49954* (2015.01)

(58) Field of Classification Search
CPC ............ F16B 19/1045; F16B 25/0021; F16B 25/106; F16B 35/044; Y10T 29/49954
USPC ........... 411/29, 500, 504, 386, 446, 453, 455, 411/501
See application file for complete search history.

(56) References Cited

U.S. PATENT DOCUMENTS

| 1,840,928 | A | | 1/1932 | Anthony |
| 2,015,159 | A | * | 9/1935 | Rosenberg .................... 411/386 |
| 2,703,419 | A | * | 3/1955 | Barth .......................... 470/204 |
| 3,156,152 | A | * | 11/1964 | Reed ............................ 411/386 |
| 3,178,989 | A | | 4/1965 | Siebol |

(Continued)

FOREIGN PATENT DOCUMENTS

| DE | 1947969 A1 | 4/1970 |
| DE | 2013387 | 10/1971 |

(Continued)

*Primary Examiner* — Roberta Delisle
(74) *Attorney, Agent, or Firm* — Boyle Fredrickson, S.C.

(57) ABSTRACT

The invention proposes a blind fastening element, which is constructed similarly to a screw. The fastening element thus has a head (1), which is disposed on one end of the shaft (3) and has a contact surface, which faces toward the shaft, for contact on the object to be fastened. On the opposite front end, the fastening element has a punch face (7), which runs approximately transversely to the longitudinal axis and is enclosed by a closed punch edge (8). The diameter of said punch face is less than the diameter of the shaft, for example, the diameter is in the range of approximately 70% to 30% of the diameter of the shaft. The shaft itself may be smooth on its exterior, if the fastening element is to be used as a blind rivet, or may have a thread (9), however, if the fastening element is to be fastened after the punch procedure by rotating.

34 Claims, 4 Drawing Sheets

(56) References Cited

U.S. PATENT DOCUMENTS

| | | | |
|---|---|---|---|
| 3,724,315 A * | 4/1973 | Sygnator | 411/386 |
| 4,218,953 A | 8/1980 | Haytayan | |
| 4,355,466 A | 10/1982 | Quiring | |
| 4,952,110 A * | 8/1990 | Avgoustis et al. | 411/386 |
| 4,981,406 A * | 1/1991 | Weiss et al. | 411/386 |
| 5,234,301 A * | 8/1993 | Grossberndt et al. | 411/386 |
| 5,361,478 A * | 11/1994 | Grossberndt et al. | 29/432.2 |
| 5,419,667 A * | 5/1995 | Avgoustis | 411/386 |
| 5,678,970 A | 10/1997 | Caulk | |
| 5,863,167 A * | 1/1999 | Kaneko | 411/426 |
| 6,062,786 A * | 5/2000 | Garver et al. | 411/386 |
| 6,328,515 B1* | 12/2001 | Donovan | 411/386 |
| 6,338,600 B2* | 1/2002 | Friederich et al. | 411/424 |
| 6,428,258 B1* | 8/2002 | Osterle et al. | 411/386 |
| 6,468,013 B1* | 10/2002 | Kersten | 411/386 |
| 6,527,491 B1 | 3/2003 | Uchimoto et al. | |
| 6,764,263 B2* | 7/2004 | Carlo | 411/386 |
| 7,341,413 B2 | 3/2008 | Morris et al. | |
| 7,401,394 B1 | 7/2008 | Mueller | |
| 8,348,572 B2* | 1/2013 | Friederich et al. | 411/387.1 |
| 2001/0014262 A1* | 8/2001 | Friederich et al. | 411/386 |
| 2006/0039777 A1 | 2/2006 | Palm | |
| 2006/0039778 A1 | 2/2006 | Palm | |
| 2007/0098520 A1 | 5/2007 | Schraer | |
| 2008/0222873 A1 | 9/2008 | Draht et al. | |
| 2009/0217505 A1 | 9/2009 | Frank et al. | |
| 2010/0040432 A1* | 2/2010 | Totsu | 411/426 |
| 2010/0232907 A1* | 9/2010 | Jokisch | 411/509 |
| 2010/0284766 A1* | 11/2010 | Schramm | 411/500 |
| 2011/0033264 A1* | 2/2011 | Frank | 411/500 |
| 2011/0289752 A1* | 12/2011 | Werthwein | 29/428 |
| 2012/0219383 A1* | 8/2012 | Jokisch | 411/500 |
| 2013/0142590 A1* | 6/2013 | Frank | 411/386 |
| 2013/0142591 A1* | 6/2013 | Frank | 411/386 |

FOREIGN PATENT DOCUMENTS

| | | |
|---|---|---|
| GB | 1 479 600 | 7/1977 |
| GB | 2140891 A | 12/1984 |
| JP | 3066911 A | 3/1991 |
| JP | 10061628 A | 3/1998 |
| JP | 2004344952 A | 12/2004 |
| RU | 2114328 C1 | 6/1998 |
| RU | 2307961 C1 | 10/2007 |
| WO | 2009024311 A2 | 2/2009 |

* cited by examiner

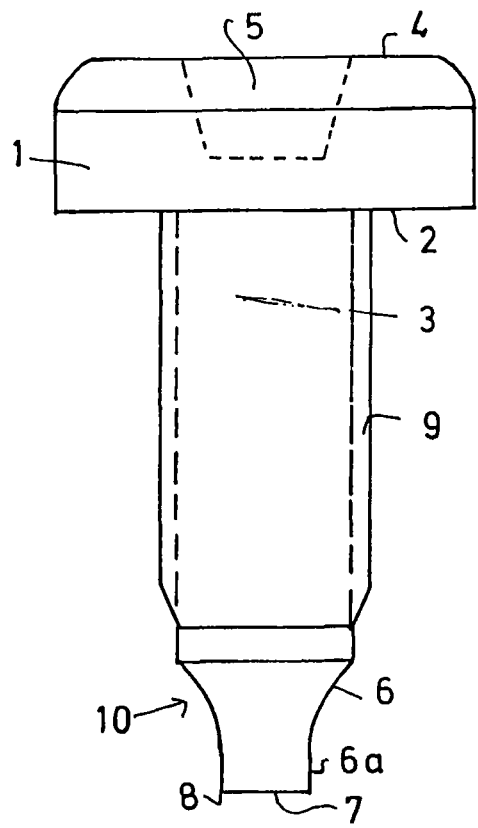
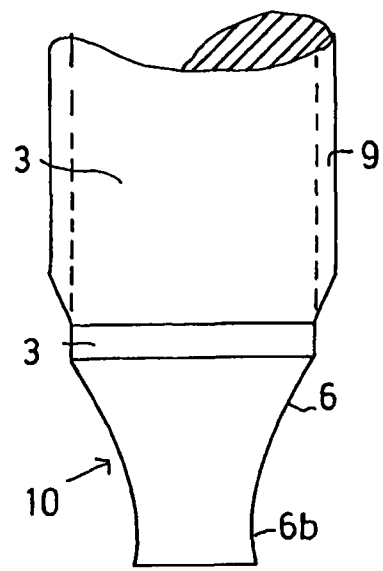
FIG. 1
FIG. 2
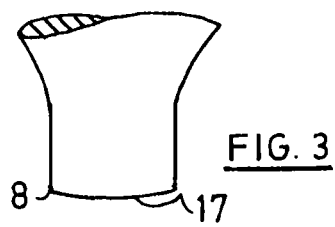
FIG. 3
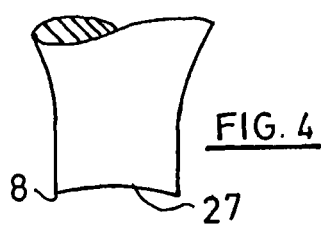
FIG. 4
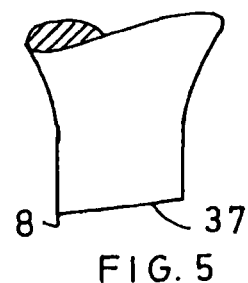
FIG. 5
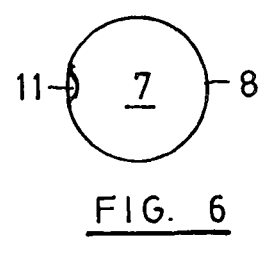
FIG. 6

FASTENING ELEMENT

TECHNICAL FIELD

The invention relates to a fastening element, particularly for the connection of components, with which fastening can occur from the front side, without requiring access to the rear side. Fastening elements of this type can, for example, be blind rivets, nails or even self-boring screws.

BACKGROUND ART

A nail as a blind fastening element is already well known (DE 102006002238), which is driven at high speed without rotation through the component that is not yet drilled in the joint area, so that the nail tip completely penetrates both components until the underside of the nail head bonds together with the thrown-up material. This nail can feature a rib-like spiral profile or a thread for detaching the connection.

Blind rivets with ballistic tips are also well known.

SUMMARY OF THE INVENTION

The task of the invention lies in creating a fastening element that is simple in design and provides good fastening results under the most differing of prerequisites.

Whilst, with the fastening element mentioned at the outset, the hole is produced by the considerable deformation of components with the warping thus created, the hole formed with the fastening element according to the invention initially forms the hole, in that, part of both components or at least one of the components is punched out. This leads to a clearly clean hole edge.

The fastening element according to the invention features a tool application formation at which a tool for carrying out the punching process is applied. This is usually a tool acting in longitudinal direction of the fastening element that exerts a jerky or sudden movement of a force on the fastening element in its longitudinal direction.

To carry out the fastening process, a tool application formation is also provided, which, if necessary, can also be identical with the tool application formation for the punching process. However, it can also involve another drive point, even if a single tool can be provided for both processes.

In a further development of the invention, it can be provided that the punching end of the fastening element features a face extending transversely to the longitudinal axis, which is limited by an essentially completely rotary punching edge. Thus, a defined part of the material is punched out. In a complete punching edge, the part is fully removed after punching out. However, it is also conceivable and reasonable not to form the punched edge completely circumferential in shape, but rather to provide a small part of the circumference with a rounded contour. Then, although a part of the material is punched out, whereby the punched part remains connected with the original material on a small part of the edge so that, when carrying out the fastening process, this part does not fall off, but rather is bent laterally.

The diameter of said face can be smaller than the diameter of the shaft, for example, it can preferably lie in an area of about 30% to 70%, preferably 40% to 60% of the diameter of the shaft.

When the diameter of the face is smaller than the diameter of the shaft, there is a transition area between both diameters, which begins behind the face. In this case, it can now be provided that the punching end of the fastening element extends cylindrically behind the face. Cylindrically means that the cross-section size does not change, nor does the cross-section shape change. The cross-section form does not need to involve a circular form, also the face does not need to be circular, however, the circular surface or at least an approximately circular surface is preferred. A polygon form is also possible.

Instead of a cylindrically extending section, it can be provided according to the invention that behind the face an initial undercut section is available, whereby the cross-section size initially decreases before it again increases continuously to the diameter of the shaft.

It is also possible that the transition between the punching end and the shaft is formed at least partially conical in shape. This iconicity applies both when a cylindrical section is available behind the face, and also when an undercut is provided.

Instead of a conical transition, the transition can at least extend in a partially concave shape. For transition directly into the shaft itself, also a slightly convex curve can be provided in the form of a rounded transition.

It was already mentioned that the face available at the punching end of the fastening element extends transversely to the longitudinal direction of the fastening element or rather transversely to the axis of the fastening element. Thus, it should be expressed that deviating from a plane extending perpendicularly to the longitudinal axis should also be included.

So, to be more precise, it can be provided that the front face lies in a plane. This plane can extend both perpendicularly to the longitudinal axis of the fastening element as well as slightly obliquely. The slight deviation from the perpendicular plane as a consequence leads to the punching process not resulting exactly at all points of the punching edge at the same moment, which enables a cleaner cut to be achieved under certain circumstances. Above all, the cutting power characteristic is thus favoured.

The face must not also lie in a plane, it can slightly deviate from this plane, for example, it can feature two-plane parts extending under an angle or it can be curved as well.

It was already mentioned at the outset that the blind fastening element features a tool application formation for carrying out the punching process and a tool application formation for carrying out the fastening process, subsequently to the punching process. For both processes, a single tool can be provided under certain circumstances, for example a bit.

The fastening process can involve, for example, a turning process. Although the punching process always involves a linear process in the longitudinal direction of the fastening element, the fastening process can involve a process in another direction. Accordingly, the fastening element features a tool application formation with which the fastening element can be rotated. It can, at the same time, involve the conventional screw driving points in the form of protrusions or depressions.

However, it is also possible that the fastening process is an impact process, thus, a process in the same direction as the punching process.

In yet another embodiment, it can likewise be provided that the fastening process involves pulling, thus a process in the direction opposite the punching process.

In a further embodiment of the invention, it can be provided that the shaft is formed at least partially smooth and cylindrical. This is particularly then the case if the fastening process occurs through striking or pulling.

However, it is also possible that the shaft of the fastening element features at least partially a circumferential rib. Such a rib can serve the improvement of the holding process in the components to be connected.

It is also possible and proposed by the invention that the shaft of the fastening element partially features a thread.

It was mentioned at the outset that the cross-section of the punching end can be circular, but can also deviate from the circular form. The invention proposes that the shaft of the fastening element can at least partially feature a circular cross-section.

However, it is also possible and it is proposed by the invention that the shaft features at least partially a cross-section deviating from the circle shape, for example, the form of a polygon with considerably rounded corners that is also well known under the term—trilobular—for an approximately triangular form.

According to the invention, it can be provided that the shaft of the fastening element features a blind hole originating from the top side facing away from the punching end. This blind hole can be used to insert and grip an expanding body.

According to the invention, it can be provided that the head of the fastening element, the shaft, and the punching end, form a single component.

It is also possible, however, that the punching end is a separate component but connected with the shaft and the head. This is especially then of interest if one, for whatever reason, wants to use the punching end for another or a differently treated material.

The tool's application formation for carrying out the punching process is preferably a surface aligned transversely with the axis of the head of the fastening element.

The tool's application formation for carrying out the fastening process can be formed, when rotation is part of the fastening process, as a conventional screw driving formation.

It is also possible that the tool's application formation for carrying out the fastening process is a surface extending transversely to the longitudinal axis of the fastening element. This can both be provided for fastening by pushing forward as well as for fastening by pulling.

A further possibility of how the tool's application formation for carrying out the fastening process can be formed, lies in that it does involve a sidewall surface of a blind hole in a shaft of the fastening element featuring no undercut. In that case, the sidewall surface can be both a cylindrical sidewall surface as well as a conical sidewall surface.

The head of the fastening element can involve a head as well known for screws, thus, for example, a hexagon head with a plane underside that forms a contact surface. But also a countersunk head is possible, which can then be sunken when screwing.

The invention also proposes a process with the features of the independent process claim. The fastening element is used in the process such that, with its punching end, by a sudden feed, a hole is stamped in the objects to be connected such that this hole is expanded by further feeding the fastening element, so that the feed is concluded when the thread of the shaft reaches inside the hole, and thus, the fastening element is secured up to the contact point between its head and its underside. In the process, further feed is determined during the screwing process only by means of the fastening process, for example, the screwing process.

In particular, it can be provided in the process that sudden feed is determined such that the feed ends when the thread section reaches the hole.

It can be provided also that the screwing process already begins during the straight feed, so that both movements temporally overlap.

If the head of the fastening element involves a countersunk head, the screwing process can also occur so far until the top side of the fastening head lies flush with the surface of the upper part of both objects to be connected.

According to the invention, the processes can be distinguished also through any combination of the features described herein.

BRIEF DESCRIPTION OF THE DRAWINGS

Further features, details and advantages of the invention result from the claims and the summary, of which the wording is based in reference to the Contents of the description, and of the following description of preferred embodiments to the invention, as well as on the basis of the drawing. Refer to The following figures:

FIG. 1 shows the side view of a first fastening element according to the invention;

FIG. 2 shows the punching end of a second fastening element in a magnified scale;

FIG. 3 shows a side view of the punching end with a convex face;

FIG. 4 shows a side view of the punching end with a concave face;

FIG. 5 shows a side view of the punching end with an oblique face;

FIG. 6 shows the punching edge face with an almost completely closed punching edge;

DETAILED DESCRIPTION

Figure 7:
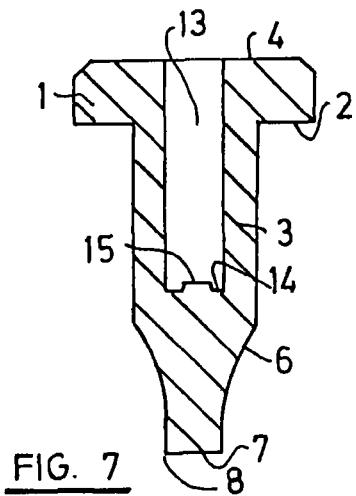
FIG. 7 show an axial section through a further fastening element.

In a simplified side view, FIG. 1 shows a first fastening element that features a head 1 on its one end. This head 1 contains an underside 2, lying in a plane to which a shaft 3 is attached. On the underside 2 opposite the top side 4 of the head, a plane surface is formed. Starting from this plane surface, a depression 5 outlined with dashes extends into the head 1, which features the form of a conventional screw driving formation. The top side 4 of the head can feature also another form, for example, it can be convex in shape.

In the area of the head of 1 of the ends facing away from the fastening element, the screw shaft 3 transforms through a concave-arched section 6 into a front face 7. This face 7 features a rotating edge 8 that is formed as a punching edge. This means that it is formed sharp edged such that it can punch the material upon striking this punching end of the fastening element. The sharpness thus depends on the type of material supposed to be punched, and on the sudden movement.

Starting from the head 1 of the fastening element, the shaft 3 features a thread 9 that is outlined. It ends shortly before the cylindrical part of the shaft 3.

This fastening element is meant to produce a hole by punching in the material to be used for fastening. The punching effect occurs through a sudden movement transmitted by a tool to the fastening element. The top side 4 of the head 1 serves this purpose. This top side 4 thus forms an application formation for a tool that should carry out the punching process.

The actual fastening inside the material vis-à-vis the fastening should occur by means of the twisting of the fastening element, whereby the fastening element is then screwed with the help of the thread 9. To be able to exercise a rotation for the screw movement on the fastening element, the depression 5 is provided in the depicted embodiment, which therefore forms the application formation for a tool for performing the fastening process. Obviously, it is also possible that the head of the fastening element is formed as a multiple-edge head, in particular as a hexagon-edge head.

The front plane face 7 in the exemplary embodiment depicted in FIG. 1 extends in a plane that extends perpendicularly to the longitudinal axis of the fastening element.

Directly behind the face 7 and hence also directly behind the punching edge 8, the punching end 10 extends first in a cylindrical section 6a or with a slight undercut from where the contour then extends in a concave curve up to the shaft 3.

FIG. 2 features only the front punching end 10 in an slightly altered embodiment. Again the face 7 extends with the punching edge 8 in a plane that extends perpendicularly to the longitudinal axis of the fastening element. Directly behind the face 7, the diameter decreases and hence the cross-section in a first section 6b. The transition between the face 7 and the shaft 3 occurs in a concave shape with an undercut behind the face 7.

Both in the embodiment according to FIG. 1 and in the embodiment according to FIG. 2, the face 7 is a plane surface that extends perpendicularly to the longitudinal axis of the fastening element. In a modification, FIG. 3 features the punching end of a further embodiment in which the face 17 is convex, whereby this face 17 still extends approximately perpendicularly to the longitudinal axis.

A corresponding, oppositely bent face 27 is shown in FIG. 4.

FIG. 5 now shows a modification in which the front face 37 is formed again as a plane surface, as in the embodiment according to FIG. 1 and FIG. 2, whereby, now this plane surface is disposed slightly obliquely vis-à-vis the type of the face of FIGS. 1 and 2. Here, the punching process thus begins in FIG. 5 on the left side, so that the punching edge does not carry out the punching process simultaneously at all points.

FIG. 6 shows the face 7 with the punching edge 8. The punching edge 8 extends essentially along a closed line and is interrupted only at a point 11 such that the transition between the sidewall surface and the face extends in a rounded-off manner. Thus, it should be achieved that the punched out part in the punching process remains hanging at a point on the material that is narrow to such an extent that it is bent without tearing off.

While the FIGS. 1 and 2 show fastening elements in which the actual fastening occurs by rotation, FIGS. 7 to 11 now show a fastening element in which subsequent fastening after the punching process occurs by pulling the punching end. The fastening element contains a head 1 that is of a similar design to the head 1 of the embodiment according to FIG. 1. The fastening element contains a shaft 3 of which the external side extends smoothly. The cross-section can be circular or approximately circular. On the cylindrical part of the shaft 3, the punching end 20 adjoins, whereby the contour 6 is concave in shape and ends in a face 7. This face is disposed like the face 7 of the embodiment according to FIG. 1. The punching end 20, however, can take also all other forms as depicted in FIGS. 1 to 6.

A blind hole 13 that originates from the top side 4 of the head 1 is formed in the interior of the shaft 3. This blind hole 13 is cylindrical and features a bottom 14. A concentric elevation 15 is formed on the bottom of the blind hole 13.

Figure 8:
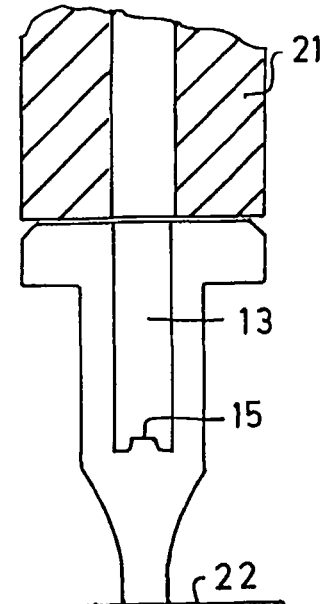
FIG. 8 shows the fastening element of FIG. 7 in a first stage of the fastening process.

The punching process for stamping a hole proceeds in this fastening element in the same manner as indicated in the embodiment according to FIG. 1. This means also that the surface of 4 of the head 1 forms the application formations for the punching tool 21 that is depicted in FIG. 8. Not depicted are remedial means, for example, for holding the fastening element on a tool. In FIG. 8, the fastening element of FIG. 7 is placed on the surface of 22 of the two sheet metals 23, 24 to be connected. Now, as first action, an abrupt feed of the tool 21 occurs, resulting in the punching end 20 forming a hole and in the further feed, the fastening element bends the edges downwards. The feed ends when the underside 2 of the head 1 lies on the top side 22 of the upper sheet metal 23. This condition is depicted in FIG. 9.

Figure 9:
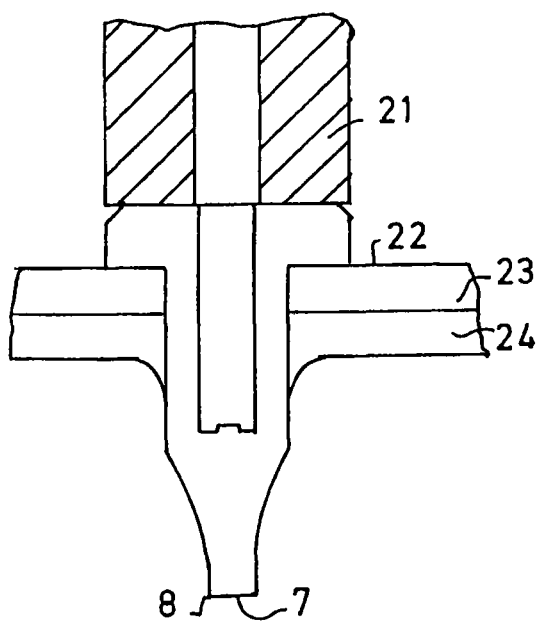
FIG. 9 shows a section corresponding to FIG. 8 after the punching process.
Figure 10:
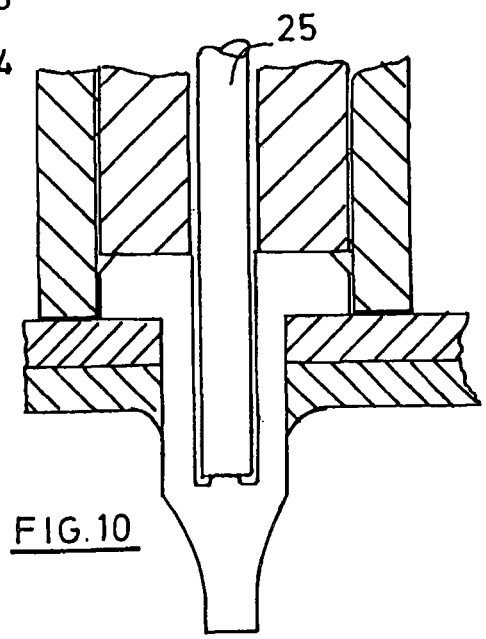
FIG. 10 shows an axial section at the beginning of the fastening process.

After the fastening element is stamped so far, as depicted in FIG. 9, it must now still be secured. For this a rod 25 is pushed into the tool 21 until it contacts the protrusion 15 inside the blind hole 13 and is connected with the latter by welding. Subsequently, retraction of the rod 25 occurs, which, in addition, leads to the part 24 available on the underside of the sheet metal of the fastening element being deformed and thus establishes the fastening element on both sheet metals 23, 24. A rivet head 26 is produced, see FIG. 11. Now the rod 25, for example, can be loosened from the fastening element by rotation or further power increase and the tool 21 is removed.

Figure 12:
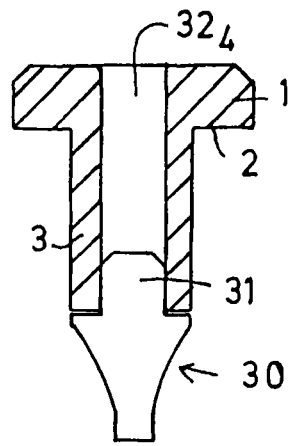
FIG. 12 shows a section corresponding to FIG. 7 through a further fastening element.
Figure 11:
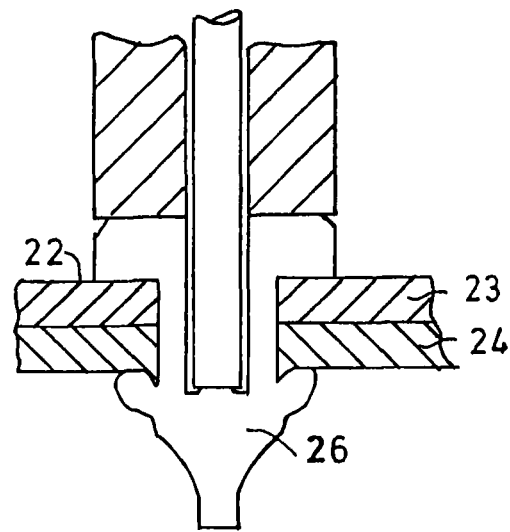
FIG. 11 shows the section corresponding to FIG. 10 after carrying out the fastening process.

In the above-depicted and described embodiments, the fastening element is always a single piece. FIG. 12 now shows a fastening element in which the punching end 30 is formed as a separate component that interacts with an extension 31 into a through boring 32 of the shaft 3 of the fastening element. It can be fixed there by clamping. The external form of the punching end 30 can correspond to any previously described form of the punching ends 10, 20. The outside diameter of the punching end 30 at its largest point corresponds to the outside diameter of the shaft 3. The fastening element depicted in FIG. 12 is used in the same manner as the fastening element in FIG. 7.

Figure 13:
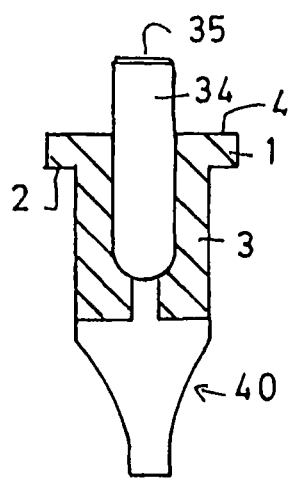
FIG. 13 shows a section corresponding to one of FIGS. 7 and 12 through yet another fastening element.

FIG. 13 shows a further fastening element with a head 1, a top side 4 and a lower contact shoulder 2. Also here, the punching end 40 is formed as a separate component. The boring in the shaft 3 contains a constriction with a distance from the underside 2 of the head 1 that is formed by a curved transition between the boring and the narrowed part of the boring. In the boring, a spigot 34 is fitted, which protrudes above the top side 4 of the head. It is part of the fastening element. This fastening element is used in the same manner for punching as in the embodiment according to FIGS. 7 and 12. However, as soon as the position of FIG. 9 is reached, a further sudden feed movement is exercised on the external face 35 of the spigot 34. Thus, the lower part of the shaft 3 is driven radially outwards so that a rivet head is formed in this manner. The punching end 40 falls off.

Figure 14:
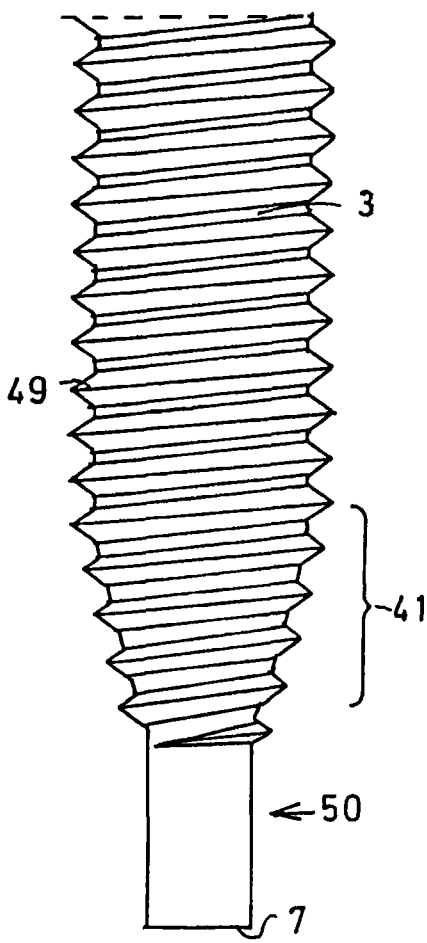
FIG. 14 shows a depiction corresponding to FIG. 2 for a further embodiment.
Figure 15:
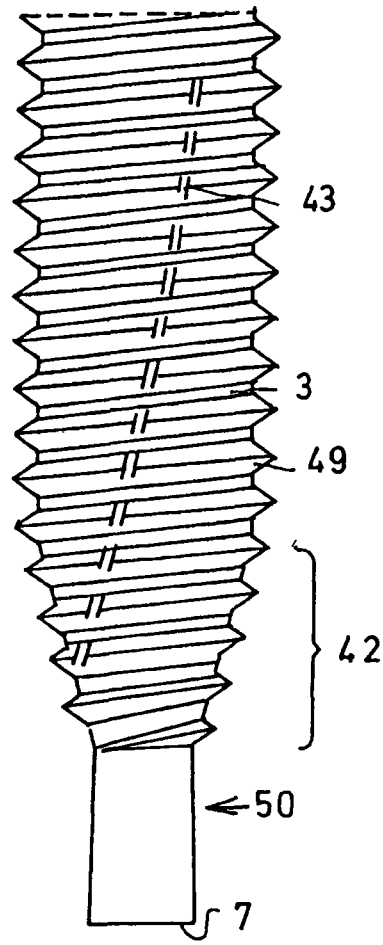
FIG. 15 shows a depiction corresponding to FIG. 14 for yet further embodiment.
Figure 16:
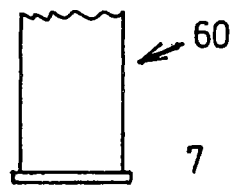
FIG. 16 shows the front punching end in an altered embodiment.

While in the previous embodiments the transition area between the punching end and the cylindrical shaft 3 is formed smooth, FIGS. 14 and 15 show embodiments in which the transition section 41, between the shaft 3 and the punching end 50, is also provided with a thread 49. In other words, the thread extends from the shaft 3 to the end of the transition section 41 where the thread 49 ends or begins according to the approach. Thus, as soon as the thread 49 reaches the hole, an enlargement of the punched hole can then occur at this point by means of the screwing process.

The transition section 41 can feature every previously described and depicted basic forms, which were depicted with reference to the FIGS. 1 to 4. The same applies also to the punching end 50 and its face 7. In the embodiment depicted in FIG. 14, the contour of the transition section 41 is convex in shape.

FIG. 15 shows an embodiment where the transition section 42 is conical in shape. The embodiment depicted in FIG. 15 differs from that according to FIG. 14, among other things, also in that a scrape point 43 is formed through the thread, which extends slightly obliquely vis-à-vis the longitudinal axis of the fastening element. With that, it can be achieved that, in order to form the thread, a cutting process also occurs.

FIG. 14 once again shows a further embodiment of a punching end 60. Directly on the face 7, a kind of plate is subsequently formed, behind which the diameter of the punching end decreases. A stepped type of undercut is formed here.

Fastening elements, as depicted in FIGS. 14 and 15, can be combined arbitrarily with faces and any fastening element heads.

The thread can advantageously involve a self-cutting thread. It is also possible, however, that it involves a sheet metal screw or wood thread.

The fastening element can serve to fasten different materials together, for example sheet metal on sheet metal, sheet metal on wood and sheet metal on plastic. It can be provided to use different thread forms for different application cases.

In the depicted embodiments, the screw thread extends on the shaft up to the underside of the screw head or countersunk head. This is not required. It can suffice also if the thread, for example, only extends over half of the shaft. The arrangement in which the thread does not extend up to the underside of the head is particularly then advantageous if the sheet metal at disposal near the head of the fastening element should be pulled up to the base.

The invention claimed is:

1. A blind fastening element with
    a shaft (3),
    a head (1) formed on the one end of the shaft (3), which head, on its underside (2) facing the shaft (3), includes a contact surface,
    a punching end (10, 20, 30, 40) formed on the opposite front end of the shaft (3), said punching end having a punching edge configured for a cutting operation without rotation during a punching process,
    a transition region between the punching end and the head end of the shaft for widening the hole,
    a cutting thread which extends over the transition region between the punching end and the head end of the shaft (3),
    a tool application formation for carrying out said punching process without rotating said fastening element as well as
    a tool application formation on the head for receiving a tool to carry out a fastening process, the tool application formation configured to allow rotation of the tool on the tool application formation without imparting the rotation to the blind fastening element.

2. The blind fastening element according to claim 1, wherein the punching end (10, 20, 30, 40) features a transversely extending face (7, 17, 27, 37) which is essentially limited by a full punching edge (8).

3. The blind fastening element according to claim 2, wherein the diameter of the face (7, 17, 27, 37) lies between 30% and 70% of the diameter of the shaft (3).

4. The blind fastening element according to claim 1, wherein the punching end (10, 20. 30, 40) features a cylindrically extending section (6a) behind the face (7,17,27,37).

5. The blind fastening element according to claim 1, wherein the punching end (10, 20, 30, 40) features a cylindrically extending section (6b) behind the face (7, 17,27, 37).

6. The blind fastening element according to claim 1, wherein the transition between the face of the punching end and the shaft (3) is formed at least partially conical.

7. The blind fastening element according to claim 1, wherein the transition between the face of the punching end and the shaft (3) extends at least partially in a concave shape.

8. The blind fastening element according to claim 1, wherein the front face (7, 37) lies in one plane.

9. The blind fastening element according to claim 1, wherein the front face (37) lies in a slightly oblique plane extending opposite a transverse plane.

10. The blind fastening according to claim 1, wherein the punching edge (8) deviates slightly vis-á-vis a plane.

11. The band fastening element according to claim 1, wherein the fastening process is rotation or comprises rotation.

12. The blind fastening element according to claim 1, wherein the fastening process is striking or comprises striking.

13. The blind fastening element according to claim 1, wherein the fastening process is pulling or comprises pulling.

14. The fastening element according to claim 1, wherein the shaft (3) is at least partially smooth and cylindrically formed.

15. The fastening element according to claim 1, wherein the shaft (3) partially features at least a circumferential rib.

16. The fastening element according to claim 15, with at least a scrape point (43).

17. The blind fastening element according to claim 1, wherein the shaft (3) at least partially features a thread (9).

18. The blind fastening element according to claim 17, wherein the thread extends over the transition region between the punching end and the shaft (3).

19. The blind fastening element according to claim 1, wherein the shaft (3) at least partially features circular cross-section.

20. The fastening element according to claim 1, wherein the shaft (3) at least partially features trilobular cross-section.

21. The fastening element according to claim 1, wherein the shaft (3) features a blind hole (13) originating from the top side (4) of the head (1) facing away from the punching end (30).

22. The blind fastening element according to claim wherein the shaft, the head, and the punching end form a single-piece component.

23. The fastening element according to claim 1, wherein the punching end (30, 40) is a component that is separate but connected with the shaft (3).

24. The blind fastening element according to claim 1 wherein the tool application formation for carrying out the punching process is a surface (4) of the head (1) of the fastening element extending transversely to the axis of the fastening element.

25. The blind fastening element according to claim 1 wherein the tool application formation for carrying out the fastening process is formed as a conventional screw driving formation (5).

26. The blind fastening element according to claim 1, wherein the tool application formation for carrying out the fastening process is a surface extending transversely to the longitudinal axis of the fastening element.

27. The fastening element according to claim 1, wherein the tool application formation for carrying out the fastening process is a sidewall surface of a blind hole inside the shaft of the fastening element.

28. The fastening element according to claim 1, wherein the tool application formation for carrying out the fastening process is a conical sidewall surface of a blind hole inside the shaft of the fastening element.

29. The blind fastening element according to claim 1, wherein the head (1) features a plane contact shoulder on its underside (2).

30. The fastening element according to claim 1, wherein the head of the fastening element is a multiple-edged head, in particular a hexagon head.

31. A procedure for setting a fastening element having a shaft (3), a head (1) formed on the one end of the shaft (3), and a punching end (10, 20, 30, 40) formed on the opposite front end of the shaft (3), the procedure having the following process steps:
   with the punching end (10, 20, 30, 40) of the fastening element, a hole is cut by a sudden feeding of the fastening element without rotation into objects (23, 24) to be connected,
   the hole is expanded by a further feeding of the fastening element,
   the feeding is concluded as soon as a thread (9) of the shaft (3) reaches the hole or gets inside the hole, resulting in the fastening element being inserted.

32. The procedure according to claim 31, wherein the sudden feeding is adjusted such that when the thread section (9) reaches the hole, the feed ends.

33. The procedure according to claim 31, wherein the processes of sudden feeding and screwing process overlap chronologically.

34. The procedure according to claim 33, wherein at the beginning of the sudden feeding the fastening element is already set in rotation.

\* \* \* \* \*